Sept. 21, 1937.  E. M. STAPLES  2,093,986
CIRCULAR CUTTING TOOL
Filed Oct. 7, 1936    2 Sheets-Sheet 1
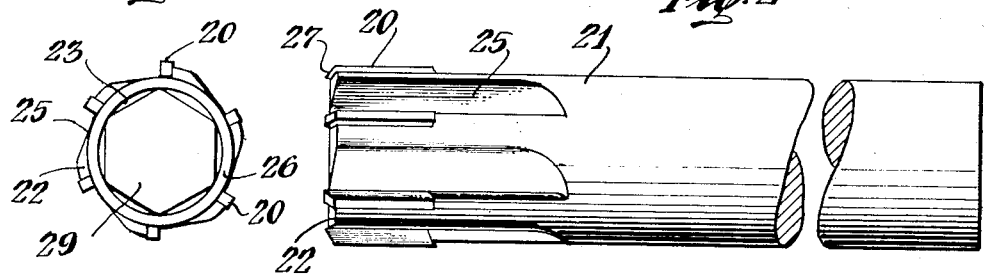
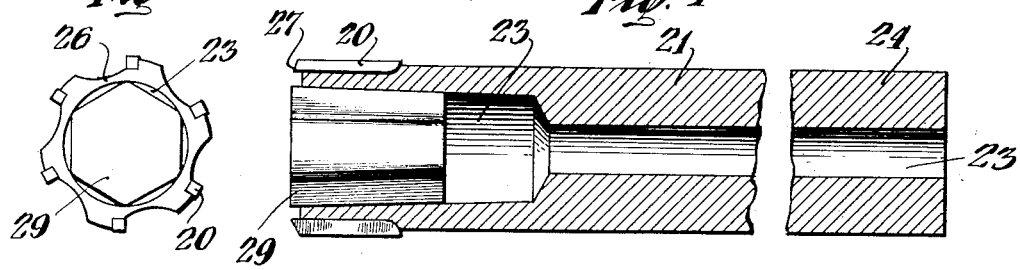
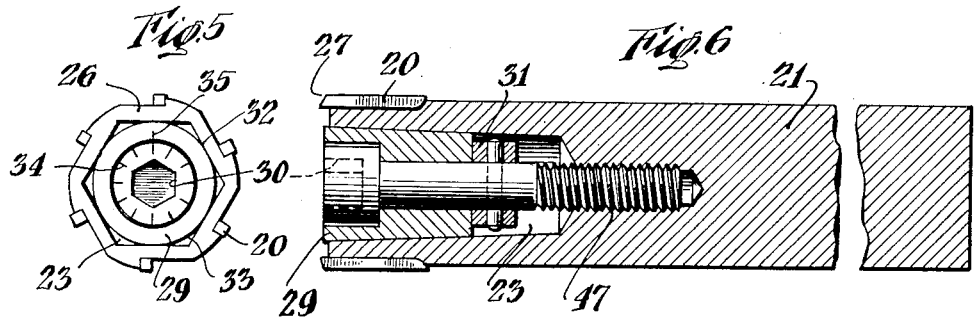
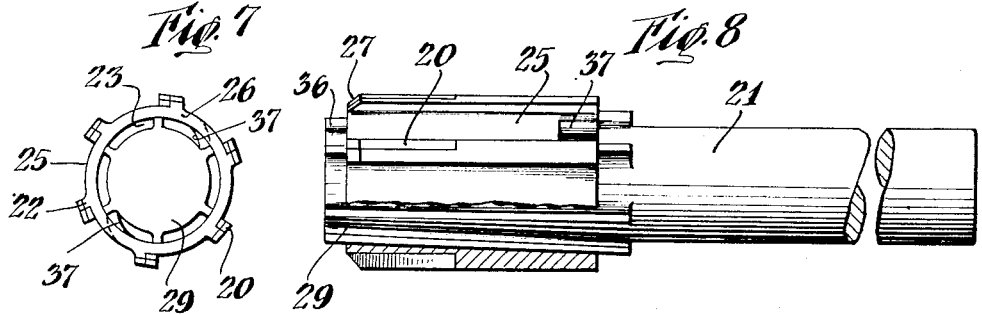
INVENTOR
*Evans M. Staples*
BY
Watson, Bristol, Johnson and Leavenworth
ATTORNEYS Sept. 21, 1937.  E. M. STAPLES  2,093,986
CIRCULAR CUTTING TOOL
Filed Oct. 7, 1936  2 Sheets-Sheet 2
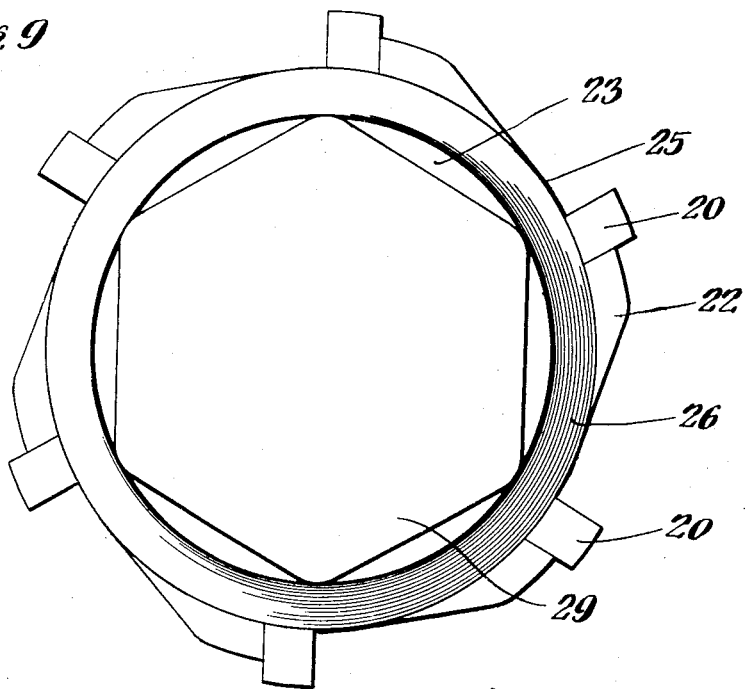
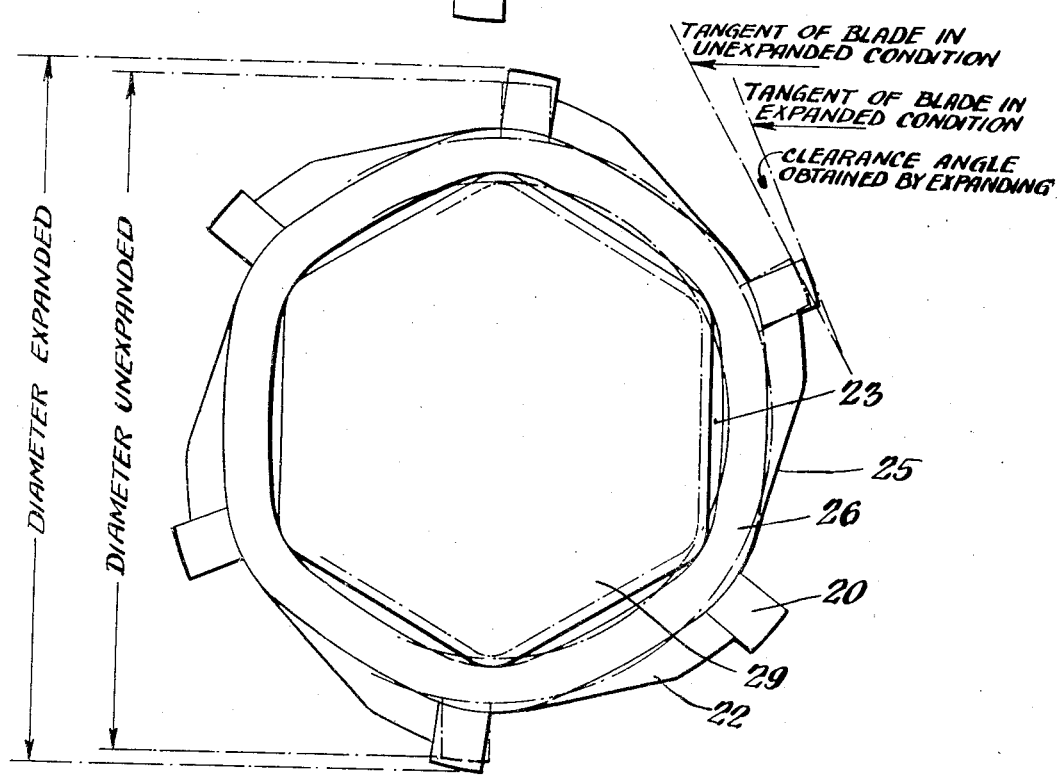
INVENTOR
Evans M. Staples
BY
Watson, Bristol, Johnson & Leavenworth
ATTORNEYS Patented Sept. 21, 1937

2,093,986

UNITED STATES PATENT OFFICE 2,093,986

CIRCULAR CUTTING TOOL

Evans M. Staples, Cincinnati, Ohio

Application October 7, 1936, Serial No. 104,514

19 Claims. (Cl. 77—76)

This invention relates to circular cutting tools, especially those intended for metal working. The tools which may embody its use are reamers, taps and milling cutters.

The object of the invention is to provide tools of this character which are accurately adjustable as to diameter across the cutting edges and which possess the desirable character of solid tools while being easily regulatable as to size, and during the course of such adjustment the clearance of the cutting edges is preserved by virtue of a rocking action given to the cutting edges during the expansion.

When solid tools of great accuracy are used in metal working, accuracy of the work that they operate upon is due to the rigidity of the tool and attendant lack of vibration or "chatter". This rigidity preserves the life of the cutting edges. When it becomes dull, the tool must then either be plated with a hard metal such as chromium, and then be reground, or be reground to a smaller size without plating.

Expansion tools have been designed to overcome these disadvantages, particularly as applied to reamers and taps. In these, expansion is brought about by a tapered plug which is moved into the tool body to expand it. In one class of expansible tools the body is slotted so as to make the expansion easy, but such tools have a tendency to chatter. In another class of expansible tools, as exemplified by the Patent Number 1,095,265 to Jacobs, a plug expands the tool body radially. The tools of this second class do not preserve the correct cutting clearances for they tend to rub behind the cutting edges after expansion.

My invention may therefore be said to be an improvement upon the second class of these tools exemplified by Patent 1,092,650 to Jacobs, in which construction the expansion of the tool body is truly radial. No "cocking" is imparted to the cutting edges in the Jacobs reamer.

Referring now to the drawings, Fig. 1 is an end view of one form of my invention applied to a metal cutting reamer. Fig. 2 is a side elevation of the same form.

Fig. 3 is an end view of a reamer comprising another modification. Fig. 4 is a side elevation, partly in section, of this form.

Fig. 5 is an end view of a reamer comprising another form of the invention. Fig. 6 is a side elevation, partly in section, of this form.

Fig. 7 is the end view of another modification in which the expanding plug is also the shank of the reamer. Fig. 8 is a side elevation partly in section of this type of tool.

Figures 9 and 10 are enlarged and exaggerated end views of the reamer shown in Figure 1. Fig. 9 corresponds to Fig. 1 and shows the reamer in the unexpanded condition, while Fig. 10 shows the same reamer after expansion has been accomplished.

The longitudinal sections, shown in Figures 4 and 6, are obtained by cutting the tools vertically on a line which would pass through the central axis. However, the expanding means in the tool shown in Figure 4 is not shown as a section but as a side elevation. In other words, it is unsectioned.

Referring now to all figures, 20 represents inserted cutting blades of hard material such as tool steel or tungsten carbide alloy. Such blades may be attached to a tool body 21 by brazing, electric welding or any other of the methods heretofore employed to hold such blades to bodies. Where tungsten carbide alloy blades are used, it is an essential condition for the long life of the blades that they shall lie in grooves defined by shoulders 22, which support the cutting blades laterally.

The tool body 21 is hollow as to its forward portion, the hollow space being designated by 23. The hollow space may extend completely to the rear of the shank 24 of the tool as shown in Fig. 4 to facilitate removal of the expansion means.

The grooves referred to are part of flutes 25, parallel to which the blades 20 lie. Such flutes are of ample breadth and depth to permit the tool to free itself of chips. The depth of such flutes is also sufficient to make the thickness of the connecting web 26 small enough so that it will deform under the influence of the expanding means, which is to be described.

The forward ends 27 of the cutting blades 20 are bevelled, as shown in Figs. 2, 4, 6 and 8.

The expanding means generally designated 29, comprises a plug which is an essential element in all tools made according to my invention. The plug 29 is tapered to a decreasing diameter toward one end of the tool as shown in Figs. 4, 6 and 8. Some device for advancing or retracting the plug longitudinally may be a part of the expanding means as shown in Fig. 6, but the preferred method of moving the plug into and out of the tool body is by driving it with a hammer. A drive-out rod may be inserted through the space 23 of Fig. 4 when it is desired to remove the plug. In the form shown in Figs. 5 and 6, 30 is a hexagonal opening in the forward end of the tool into which a correspondingly shaped wrench may be inserted for the adjustment of the plug 29. The screw 47 moves longitudinally when rotated and carries the plug 29 with it. A washer 31 is pinned on the screw shank so that rotation of the latter will move the plug backward when its retraction is desired.

The plug 29 may be of several different shapes, as shown in Figs. 4, 6 and 8 and still operate according to my invention. It may be a regular polygon as in Figs. 1 and 3; it may be round as in Fig. 5; or, it may be of the fluted type shown in Figs. 7 and 8. The principle which runs through all of these forms is that the expansion is greater directly under the cutting edges of the blades than at any other part of the circumference. Thus the interior surface of the outer shell, the plug, or both, may be polygonal, or fluted, so as to provide that the expanding pressure of the plug is exerted beneath each cutting edge. The cutting edges are therefore raised, not radially, but cocked as shown in Fig. 10, thereby imparting more clearance to the tool.

In the forms in which a hexagonal or fluted plug is employed (Figs. 1 to 4 incl., 7 and 8), each apex of the hexagon or each flute (Fig. 7) makes contact with the tool body immediately under one of the blade cutting edges. It is evident therefore that a blow driving the plug into the tool body and expanding the latter will tend to cause the outer body to take the same contour as the plug which will bring about the cocking or addition of clearance to the tool as described.

In Figs. 5 and 6, I show a form of tool in which I am able to use a round plug 29 because I make the interior of the tool body irregular, and especially ridged under the tool edges, in contradistinction to the interiorly smooth bodies that I employ in the forms shown in Figs. 1 to 4 inclusive, 7 and 8. The irregularities or lands which have the beneficial effect of raising the tool edges are numbered 32. The irregularities 33 are interior flutes and these cooperate with the prominences 32 in expanding the tool, because they render the tool body stretchable between the cutting blades 20. It will be seen therefore that in Figs. 5 and 6 I have provided a geometrical form of tool body which is peculiarly adapted to expansion to produce the blade-cocking effect heretofore described.

In Figs. 7 and 8 I show a form of tool in which the expanding plug 29 is made a part of the tool shank. This construction is especially desirable when the tool must be piloted into the hole to be reamed, since a pilot (not shown) may readily be affixed to the tool. One or more inwardly be turned projections 37 may, if necessary, be provided at the rear end of the tool body by slotting the thin section of the tool body for a short distance and turning down the edge. These projections bear against the lands of the fluted expanding plug and prevent the outer tool body from turning on the plug and destroying the adjustment of the tool.

From the foregoing description it is believed that the operation of the taps and reamers and their expanding means will be evident to those skilled in the art. In order to be certain of understanding, however, I will state that the tools of my invention are used just as the corresponding solid tools are used until it is necessary to expand them.

In the preparation of tools of my invention the tool may be finished directly to the desired size, and relief when necessary obtained by conventional method. In such case the "cocking" action of the cutting blades is not of advantage when used at the machined or ground size but it is of advantage when the tool is expanded to compensate for wear. However, to facilitate manufacture and to secure uniformly and slightly relieved cutting edges, I prefer to prepare these tools to a size slightly under the working size desired. I then expand them to the working size, thus facilitating the accurate sizing of the tool and simultaneously obtaining the desired relief.

This will be readily understood from the enlarged and exaggerated showing of Figs. 9 and 10. Fig. 9 shows the tool ground cylindrically to a size slightly under the working size and without any back clearance provided for the cutting edges. When the expanding plug is driven into the tool body the outer shell tends to conform to the shape of the plug and produces the result shown, in exaggerated form, in Fig. 10. For purposes of comparison, the unexpanded condition of the tool is shown in dotted lines in this figure. The dimension lines at the left show the increase in diameter due to expansion, while the tangent lines at the right show how back clearance is obtained by tilting the cutting elements backward.

The accuracy and ease with which a desired working size can be attained and back clearance provided make possible a great saving in the time formerly necessary to prepare a reamer to do a particular job. Furthermore, when continued operation has reduced the diameter of the tool to the tolerance limit, one or two blows of a hammer will suffice to expand it to the desired size and restore the necessary back clearance. This can be done without removing the tool from the machine in which it may be used. In this way the tools made in accordance with my invention can be maintained in service for much longer periods of time between grinds than is possible with reamers of other types.

In the forms shown in Figs. 1 to 4 inclusive, 7 and 8, the expansion of the tool to a desired size is accomplished by driving plug 29 into the tool body, with a hammer or other appropriate tool, until the desired expansion has been obtained, which fact can be checked by measuring the diameter of the tool at the cutting edges with a micrometer. In the forms shown in Figs. 5 and 6, a hexagon wrench is applied to hexagon socket 31 and rotated until the plug 30 travels a sufficient distance into the tool body. Checking of the outside cutting diameter is necessary after each expansion step unless the tool is provided with a scale 34 and reference line 35 as shown in Fig. 5. These scales are preferably so graduated that an increase of one division will create 0.001 inch expansion in the cutting diameter of the tool.

It is to be understood that all of the reamers herein shown may be altered as to their blades, i. e., serrated and relieved, to make taps of them, or the converse may be done to make reamers of taps. It is also to be understood that if desired the tool body and cutting blades may be formed integrally from a single piece of a suitable material.

In manufacturing the tool bodies shown in Figs. 5 and 6, forging may be employed, i. e. a die may be forced into a hot circular tube to give it the desired configuration.

The invention described in this application is a continuation in part of my prior application Serial No. 724,348 filed May 7, 1934.

I claim:—

1. An adjustable tool for cutting an interior surface by rotation relative to the material being worked, comprising a cylindrical shell having substantially longitudinal cutting-edged elements on its outer surface, and a plug for varying the configuration of the shell, the interior surface of the shell and the plug being provided with complementary tapered surfaces arranged with respect to each other so that the plug will contact a narrow longitudinal area of the interior surface of the shell, the longitudinal center line of the narrow area being substantially parallel with and ahead of a radial plane through the center of each cutting element, whereby the configuration of the shell may be changed to increase the cutting diameter and back clearance of the blades by forcing the plug into the shell.

2. An adjustable tool for cutting an interior surface by rotation relative to the material being worked, comprising a cylindrical shell having substantially longitudinal cutting-edged elements on its outer surface, and a plug for varying the configuration of the shell, the interior surface of the shell and the plug being provided with complementary tapered surfaces arranged with respect to each other so that there is a narrow longitudinal area of contact between the plug and the interior of the shell, the center line of said area being substantially parallel with and ahead of the center line of each cutting element, whereby the configuration of the shell may be changed to increase the cutting diameter and back clearance of the blades by forcing the plug into the shell.

3. An expansible cutting tool which comprises a substantially cylindrical shell having substantially longitudinal cutting-edged blades spaced circumferentially about its outer surface, and a tapered longitudinal opening, a correspondingly tapered plug within the shell shaped so that it will exert an expanding pressure against the shell along narrow areas substantially parallel with and near the forward edge of each cutting blade, the center of pressure against the shell being forward of a radial plane through the midsection of the cutting element whereby upon expansion the blades will be extended outwardly and tilted backwardly so as simultaneously to increase the cutting diameter and back clearance of the cutting edges.

4. In an expansible cutting tool, the combination which comprises a hollow unbroken substantially cylindrical tool body having substantially longitudinal cutting-edged blades spaced circumferentially about its outer surface, a tapered longitudinal opening in the body, and a correspondingly tapered plug for said opening shaped so as to contact with the body along lines substantially under the cutting edges of the said cutting blades, the center of pressure of the plug against the shell being forward of a radial plane through the midsection of the blade whereby movement of the plug into the opening will cause the tool body to be expanded under the cutting edges so as simultaneously to increase the cutting diameter and back clearance of the cutting blades 5. In an expansible cutting tool, the combination which comprises a substantially cylindrical body having an opening substantially concentric with its longitudinal axis, a plurality of substantially radial cutting-edged blades arranged about the cylindrical body, expanding means in said opening of a configuration such that it makes contact with the said body along narrow areas adjacent the cutting edges of the said blades, the center of pressure of each area of contact of the plug against the shell being forward of a radial plane through the midsection of the corresponding cutting blade whereby the configuration of the shell may be changed to increase the cutting diameter and back clearance of the blades.

6. In a tool such as a reamer, a substantially cylindrical tool body having a plurality of substantially longitudinal cutting-edged blades spaced about its periphery, a tapered hollow space in the tool body, and a correspondingly tapered plug adapted to fit the tapered hollow space, and having a plurality of protuberant inter-facial edges, one for each cutting blade, the tapered plug being so shaped and so oriented in the hollow space, that it will exert a pressure outwardly against the tool body adjacent each of the cutting edges of said cutting blades, the center of pressure of each area of contact being ahead of a radial plane through the midsection of the blade, so as to increase the cutting diameter of the blades and increase the back clearance, when the plug is moved into the space.

7. An adjustable tool for cutting an interior surface by rotation relative to the material being worked, comprising a cylindrical shell having substantially longitudinal cutting-edged elements on its outer surface, and a conical inner-surface, a tapered polygonal plug having a number of protuberant inter-facial edges, one for each cutting element on the cylinder, positioned within the shell so that the edges of the polygonal plug will exert a pressure outwardly against the conical interior surface adjacent each of the cutting edges the center of pressure of each contact area being ahead of a radial plane through the midsection of the corresponding cutting element, whereby the configuration of the shell may be changed to increase the cutting diameter and back clearance of the blades by forcing the plug into the shell.

8. In a tool, such as a reamer, a substantially cylindrical tool body having a plurality of substantially longitudinal cutting-edged blades spaced about its periphery and tapered opening, the wall of said opening having interior areas, each area being substantially parallel with and in advance of a radial plane through the midsection of the adjacent blade, and a correspondingly tapered plug in said space adapted to contact with the interior areas of said tool body whereby the tool body may be expanded along lines adjacent the cutting edges of the blades, so as simultaneously to increase the cutting diameter and back clearance of the cutting blades.

9. An adjustable tool for cutting an interior surface by rotation relative to the material being worked, comprising a cylindrical shell having substantially longitudinal cutting-edged elements on its outer surface, and a tapered longitudinal opening of polygonal cross-section, a tapered plug for cooperation with the opening, the orientation of the polygonal opening with respect to the cutting elements, and the shape of the opening being such that the tapered plug, when forced into the opening will exert a pressure against the polygonal walls throughout narrow longitudinal areas the centers of pressures of which are substantially parallel with the cutting edges of the cutting elements, and ahead of radial planes through the midsections of the element whereby the configuration of the shell may be changed to increase the cutting diameter and the back clearance of the blades.

10. In a tool, such as a reamer, an expansible cylindrical tool body having a plurality of substantially longitudinal cutting-edged blades spaced about its outer circumference, a hollow tapered opening of polygonal cross section in the forward end of said tool body, a correspondingly tapered plug of circular cross section in said space making line contact with the walls of said polygonal space, the orientation of the tapered polygonal opening with respect to the cutting blades being such that points of minimum diameter occur substantially under the cutting edges of the cutting blades, so that when the plug is forced into said space, it will expand the body adjacent the cutting edges of said blades, thereby increasing the cutting diameter and tilting the blades to provide more clearance.

11. In combination, a hollow substantially cylindrical tool body, a tapered opening therein, cutting-edged blades mounted substantially longitudinally on the periphery of said body, and longitudinal interior ridges in the opening, the longitudinal centers of which are substantially beneath the cutting edges of the said blades, a correspondingly tapered expanding member within said body, said ridges engaging said expanding member within said body, in order, on further entrance of said expanding member, to force said ridges radially outward thereby to increase the cutting diameter of the blades at the edges and simultaneously to increase the back clearance by placing the parts of said tool body lying between the cutting blades under tension, and by bending the tool body adjacent the cutting edges.

12. An expansible circular cutting tool which comprises a substantially cylindrical shell, cutting blades spaced circumferentially about the shell, said shell extending continuously between each blade, and an expanding plug within the shell and engaging the latter beneath each blade, the shell and plug having such configuration and being so constructed that the blades are at the rear of the line of contact whereby upon expansion of the shell by the plug, the blades are extended outwardly and backwardly to obtain increased clearance for the cutting edges.

13. In a circular expansible cutting tool, the combination which comprises a hollow unbroken substantially cylindrical tool body, a forward outer portion thereof consisting of alternate flutes and shoulders parallel to each other and to the longitudinal axis of the body, cutting blades lying along said shoulders, a single opening in the forward end of said body, concentric to the longitudinal axis of said body and a gently tapered plug in said opening, small end furthest in, said plug making contact with the body along lines substantially under the cutting edges of the said cutting blades whereby upon further entrance of the plug into the opening the tool body will be expanded most under the cutting edges and increased clearance will be given said edges.

14. In an expansible circular cutting tool, the combination which comprises an unbroken substantially cylindrical body capable of being circumferentially expanded and having an opening, said opening being concentric with the longitudinal axis of said body, a plurality of flutes and shoulders alternatively arranged on the circumference of the forward end of said body parallel to the longitudinal axis thereof, cutting blades abutting said shoulders and being arranged substantially radial, expanding means in said opening making contact with the said body on lines substantially and only under the cutting edges of the said blades and capable of expanding the said body circumferentially by bending same on lines running directly under the cutting edges of the said blades.

15. In a reamer, a substantially cylindrical tool body, a plurality of parallel flutes in the forward end thereof, said flutes having shoulders at their sides, a plurality of cutting blades mounted on said body adjacent said shoulders, and substantially radial to and parallel to the longer axis of said tool body, a hollow space in the forward end of said tool body, said space tapering gently toward the rear of the tool body, a polygonal tapered plug adapted to fit the forward end of said hollow space in said space, the number of angles thereof coinciding with the number of cutting blades and contacting with the tool body directly under the cutting edges of said cutting blades.

16. In combination, a hollow unbroken substantially cylindrical tool body having a longitudinally tapered opening of circular cross-section, cutting blades on the periphery of said body, and a correspondingly tapered polygonal expanding plug for the opening, oriented with respect to the cutting edges, so as to make contact with the body near the cutting edges of blades, whereby the body will be deformed, to increase the cutting diameter and back clearance of the blades when the plug is moved into the body.

17. In combination a cylindrical tool body having a longitudinal cavity of polygonal cross-section and longitudinally arranged cutting blades in its surface, and means within the cavity of said body for expanding the latter and to simultaneously impart clearance to the cutting edges of the blades thereof, said expanding means comprising a round tapered plug making contact with the tool body only directly under the cutting edges of the said blades and adapted to bend said body directly under the said cutting edges.

18. In combination, a hollow unbroken tool body, cutting blades mounted on the periphery of said body, the body having an irregular interior composed of flutes between said blades and lands beneath said blades, the leading edges thereof being directly beneath the cutting edges of said blades and longitudinally tapered, a correspondingly tapered expanding member of circular cross-section within said body arranged to contact the tapered edges of the lands whereby the body will be deformed adjacent the cutting edges to increase the cutting diameter and back clearance of the blades when the expanding member is moved longitudinally of the tool body.

19. In combination, a hollow unbroken tool body, cutting blades mounted on the periphery of said body, flutes between said blades, said body having an irregular interior, lands within said body, the leading edges thereof being directly beneath the cutting edges of the blades, a tapered expanding member within said body, shaped to bear against the lands so that further entrance of the expanding member into the body will produce bending stresses in the parts of the tool body between the blades along the leading edges of the blades and will increase the clearance of the cutting edges by bending the body immediately above said edges while said body is expanded by said tapered member.

EVANS M. STAPLES.